(12) United States Patent
Moore (10) Patent No.: US 9,886,069 B2
(45) Date of Patent: Feb. 6, 2018

(54) DISK DRIVE MODULE

(71) Applicant: Hewlett Packard Enterprise Development LP, Houston, TX (US)

(72) Inventor: Earl W Moore, Cypress, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/111,304

(22) PCT Filed: Feb. 6, 2014

(86) PCT No.: PCT/US2014/015165
§ 371 (c)(1),
(2) Date: Jul. 13, 2016

(87) PCT Pub. No.: WO2015/119613
PCT Pub. Date: Aug. 13, 2015

(65) Prior Publication Data
US 2016/0357229 A1    Dec. 8, 2016

(51) Int. Cl.
*G06F 1/16* (2006.01)
*G06F 1/18* (2006.01)
*G11B 33/12* (2006.01)

(52) U.S. Cl.
CPC ............ *G06F 1/187* (2013.01); *G11B 33/124* (2013.01)

(58) Field of Classification Search
None
See application file for complete search history.

(56) References Cited

U.S. PATENT DOCUMENTS

| | | |
|---|---|---|
| 5,319,519 A | 6/1994 | Sheppard et al. |
| 5,557,499 A | 9/1996 | Reiter et al. |
| 5,751,551 A | 5/1998 | Hileman et al. |
| 6,918,174 B2 | 7/2005 | Kim et al. |
| 6,952,342 B1 | 10/2005 | Chen |

(Continued)

FOREIGN PATENT DOCUMENTS

JP    2001307468    11/2001

OTHER PUBLICATIONS

PCT/ISA/KR, International Search Report dated Nov. 5, 2014, PCT/US2014/015165, 9 pps.

*Primary Examiner* — Xanthia C Cunningham
(74) *Attorney, Agent, or Firm* — Hewlett Packard Enterprise Patent Department (57) ABSTRACT

A system is provided herein. The system includes a support member and a latch mechanism. The support member includes a positioning member. The latch mechanism is connected to the support member. The latch mechanism includes a handle and a retention latch. The handle is formed to rotate about an axis. Rotation of the handle to shift engagement of the handle with the positioning member between an engaged position and an unengaged position. The retention latch to engage with a chassis and secure the support member therein. The retention latch connects to the handle. In the engaged position, the handle to connect to the positioning member and the retention latch to engage with the chassis. In the unengaged position, the handle and the positioning member to disconnect and the handle to displace the retention latch to release engagement of the retention latch with the chassis.

20 Claims, 7 Drawing Sheets

(56) References Cited

U.S. PATENT DOCUMENTS

| | | | |
|---|---|---|---|
| 7,012,813 B2* | 3/2006 | Wang | G06F 1/184 |
| | | | 361/753 |
| 7,125,272 B1* | 10/2006 | Liang | H05K 7/1489 |
| | | | 361/732 |
| 7,280,352 B2 | 10/2007 | Wilson et al. | |
| 7,443,667 B2* | 10/2008 | Guo | G06F 1/187 |
| | | | 312/223.2 |
| 7,477,511 B2* | 1/2009 | Hsu | G11B 33/12 |
| | | | 361/679.37 |
| 7,492,586 B2* | 2/2009 | Peng | G11B 33/124 |
| | | | 248/694 |
| 7,518,854 B2 | 4/2009 | Salinas et al. | |
| 7,535,704 B2 | 5/2009 | Olesiewicz et al. | |
| 7,542,280 B2* | 6/2009 | Hong | G11B 33/12 |
| | | | 361/679.33 |
| 7,636,237 B2 | 12/2009 | Cheung et al. | |
| 7,677,680 B1* | 3/2010 | Chang | E05C 1/12 |
| | | | 211/26 |
| 7,684,181 B2* | 3/2010 | Peng | G11B 33/123 |
| | | | 312/333 |
| 7,782,606 B2* | 8/2010 | Baker | G06F 1/187 |
| | | | 312/223.1 |
| 8,220,756 B2* | 7/2012 | Peng | G06F 1/187 |
| | | | 248/200.1 |
| 8,351,196 B2* | 1/2013 | Sun | G11B 33/124 |
| | | | 361/679.33 |
| 8,611,103 B2* | 12/2013 | Thomas | H05K 7/1411 |
| | | | 361/679.58 |
| 2006/0139871 A1* | 6/2006 | Chen | G06F 1/184 |
| | | | 361/679.39 |
| 2008/0094794 A1* | 4/2008 | Hass | G06F 1/187 |
| | | | 361/679.33 |
| 2008/0128579 A1* | 6/2008 | Chen | G06F 1/187 |
| | | | 248/694 |
| 2008/0253078 A1* | 10/2008 | Neukam | G06F 1/183 |
| | | | 361/679.31 |
| 2009/0059509 A1* | 3/2009 | Peng | G11B 33/128 |
| | | | 361/679.33 |
| 2009/0129009 A1* | 5/2009 | Zhang | G11B 33/12 |
| | | | 361/679.34 |
| 2009/0224115 A1* | 9/2009 | Zhang | G11B 33/123 |
| | | | 248/201 |
| 2009/0279249 A1 | 11/2009 | Crippen | |
| 2009/0316349 A1* | 12/2009 | Olesiewicz | G11B 33/08 |
| | | | 361/679.33 |
| 2010/0172086 A1 | 7/2010 | Chen | |
| 2010/0187957 A1* | 7/2010 | Liang | G06F 1/187 |
| | | | 312/223.2 |
| 2010/0294905 A1* | 11/2010 | Peng | G06F 1/187 |
| | | | 248/222.12 |
| 2012/0097623 A1 | 4/2012 | Zhang | |
| 2012/0257347 A1* | 10/2012 | Liang | G06F 1/187 |
| | | | 361/679.39 |
| 2012/0267500 A1 | 10/2012 | Sun | |
| 2013/0163183 A1* | 6/2013 | Lin | G11B 33/1493 |
| | | | 361/679.33 |
| 2014/0319017 A1* | 10/2014 | Lu | G06F 1/187 |
| | | | 206/565 |

* cited by examiner

DISK DRIVE MODULE

BACKGROUND

Computing systems include hard disk drives. The hard disk drives are typically attached to a hard disk drive carrier then inserted into a computing system. For example, a hard disk drive is attached to a hard disk drive carrier and then inserted into a shelf in a computing system where it is connected to other electronic components.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Computing system designs determine requirements for components in the computing system. Space, thermal constraints, cost, and ease of use are some factors that determine the type of hard disk drive carriers that are used in a specific computing system.

In examples, a system is provided. The system includes a support member and a latch mechanism. The support member includes a positioning member. The latch mechanism connects to the support member. The latch mechanism includes a handle and a retention latch. The handle is formed to rotate about an axis. Rotation of the handle to shift engagement of the handle with the positioning member between an engaged position and an unengaged position. The retention latch to engage with a chassis and secure the support member therein. The retention latch connects to the handle. In the engaged position, the handle to connect to the positioning member and the retention latch to engage with a chassis. In the unengaged position, the handle and the positioning member to disconnect and the handle to displace the retention latch to release engagement of the retention latch with the chassis.

The phrase "disk drive" refers to a device to read data from and write data to a disk. For example, a hard disk drive uses a program to read data from and write data to a disk.

Figure 1:
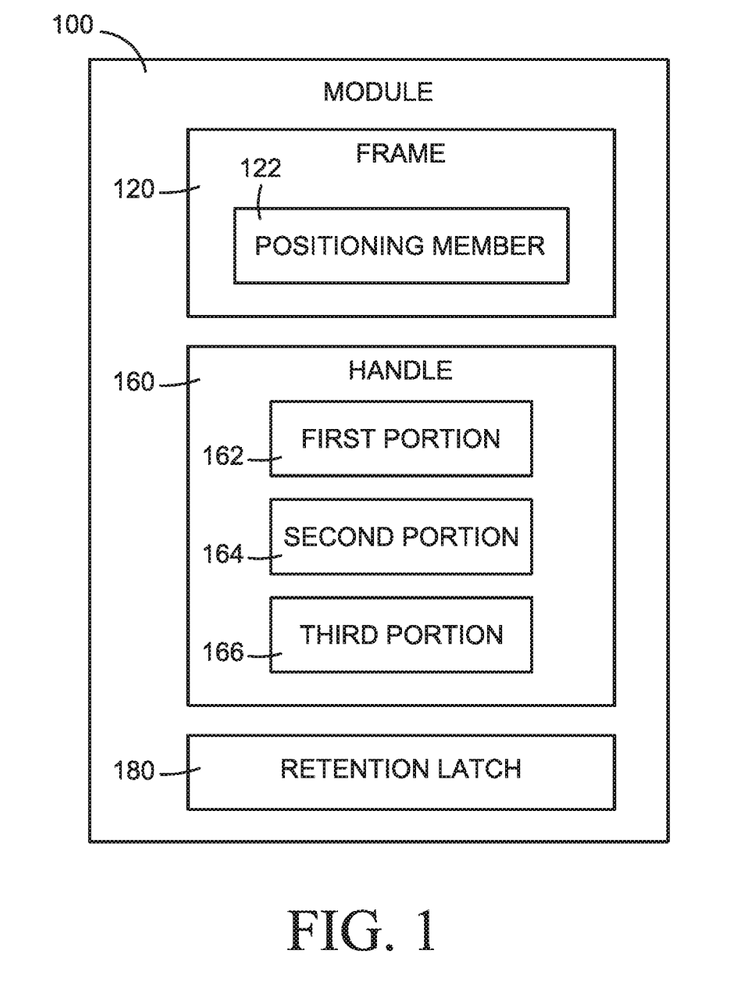
FIG. 1 illustrates a block diagram of a disk drive module according to an example.

FIG. 1 illustrates a block diagram of a disk drive module 100 according to an example. The disk drive module 100 may also be referred to as a disk drive carrier. The disk drive module 100 includes a frame 120, a handle 160, and a retention latch 180. The frame 120 includes a positioning member 122. The handle 160 is connected to the frame 120.

The handle 160 includes a first portion 162, a second portion 164, and a third portion 166. The first portion 162 to connect to a retention latch 180. The second portion 164 extends from the first portion 162 to position the handle 160. The third portion 166 extends from the second portion 164 to form a lever that rotates about an axis.

The retention latch 180 is connected to the first portion 162 of the handle 160. The handle 160 to move between a first position and a second position as the lever rotates. In the first position, the first portion 162 engages with the positioning member 122. The engagement between the first portion 162 and the positioning member 122 positions the retention latch 180 in an engaged position. In the second position, the second portion 164 engages with the frame 120 and separates the first portion 162 and the positioning member 122. Separation from the positioning member 122 positions the retention latch 180 to an unengaged position.

Figure 2A:
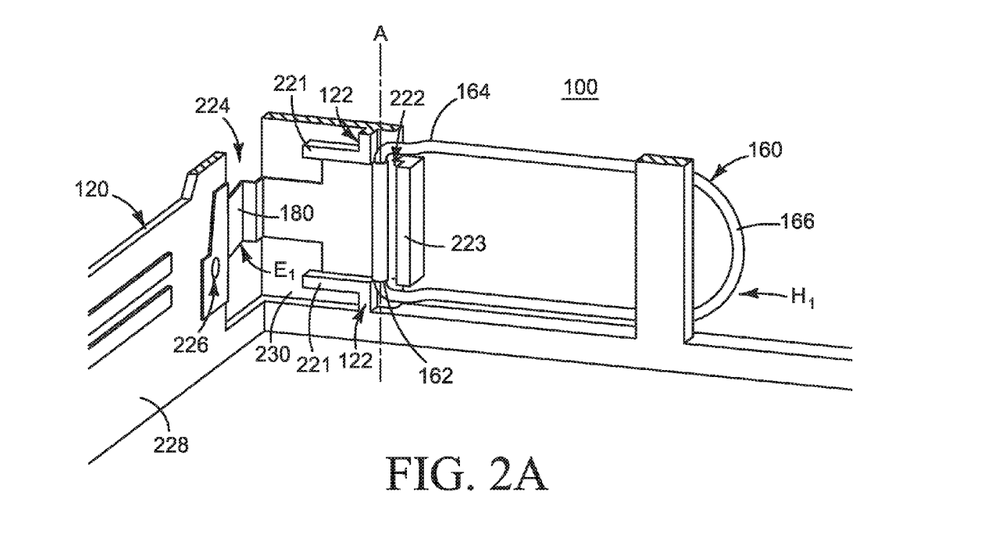
FIGS. 2A-2B illustrate interior views of a portion of the disk drive module of FIG. 1 according to an example.
Figure 2B:
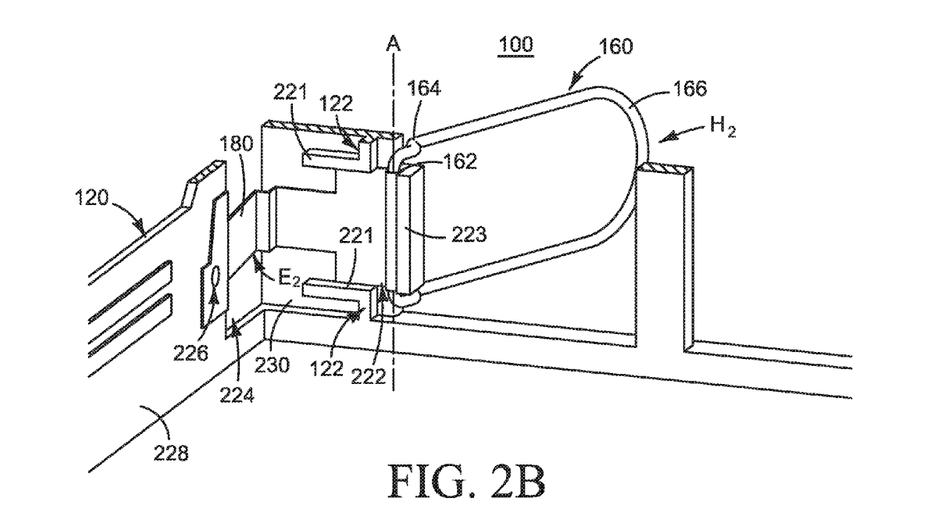
Figure 3A:
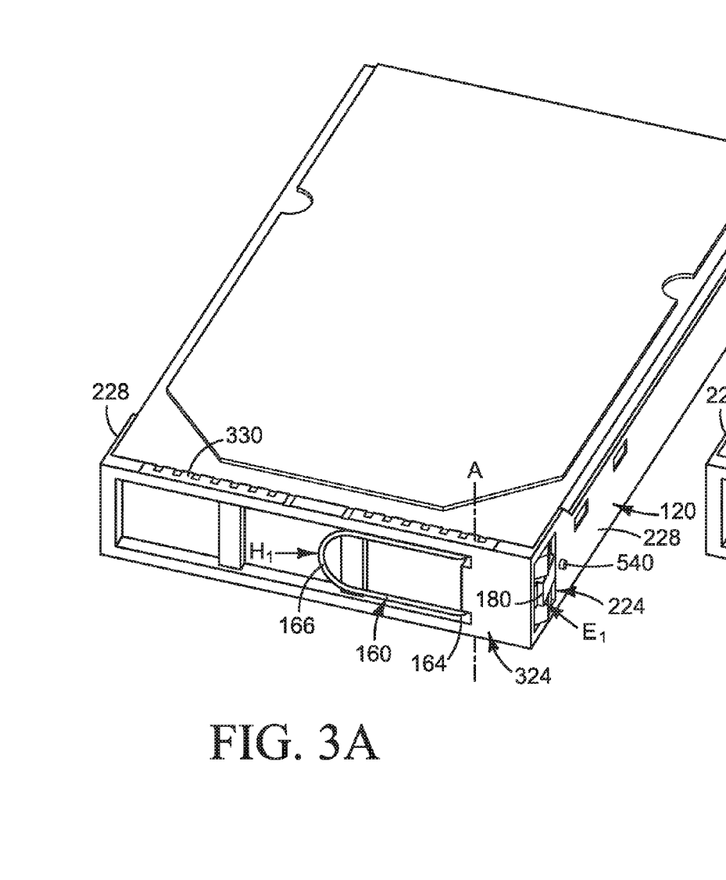
FIG. 3A-3B illustrate exterior views of a portion of the disk drive module of FIG. 1 according to an example.
Figure 3B:
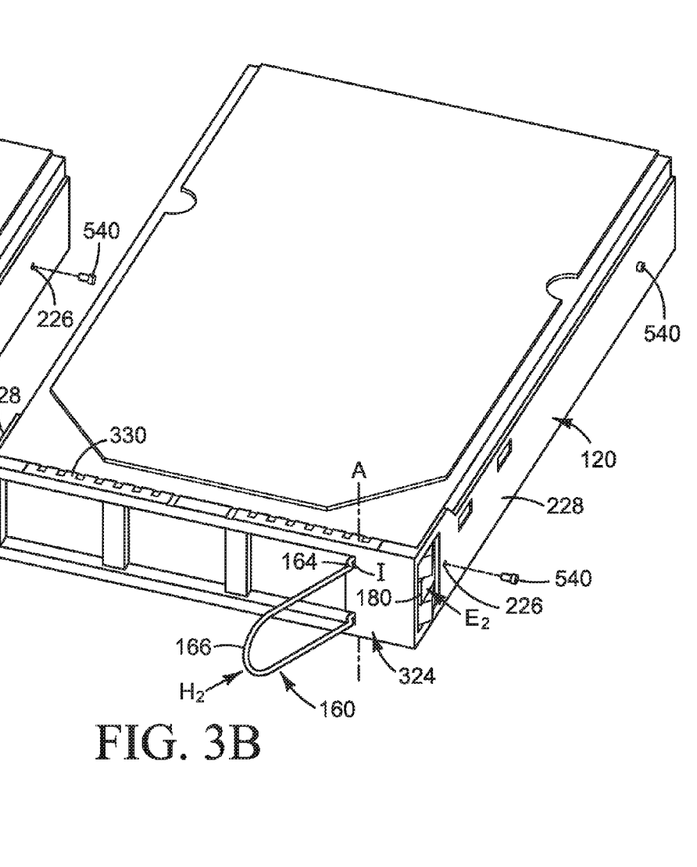

FIGS. 2A-2B illustrate interior views of a portion of the disk drive module 100 of FIG. 1 according to an example. The disk drive module 100 is illustrated to include the frame 120, the positioning member 122, the handle 160, the first portion 162, the second portion 164, the third portion 166, the retention latch 180, a latch aperture 224, and a fastener aperture 226. FIGS. 3A-3B illustrate exterior views of a portion of the disk drive module of FIG. 1 according to an example. The disk drive module 100 is illustrated to include the frame 120, the handle 160, the first portion 162, the second portion 164, the third portion 166, the retention latch 180, an electromagnetic interference (EMI) shield 330, the latch aperture 224, and the fastener aperture 226.

FIGS. 2A-2B and 3A-3B illustrate the movement of the handle 160 and the retention latch 180, as the handle 160 is rotated about an axis, A. FIGS. 2A and 3A illustrate the handle 160 in the first position, $H_1$ and the retention latch 180 in the engaged position, $E_1$. Referring to FIG. 2A, the lever or third portion 166 of the handle 160 is illustrated as a wire pull handle that lies approximately flush with the frame 120, and the first portion 162 engages with the positioning member 122. The engagement between the first portion 162 and the positioning member 122 positions and secures the retention latch 180 in an engaged position, $E_1$.

In the example, the positioning member 122 is formed of two L-shaped guide members 221 that are formed along the interior surface 230 of the frame 120. The retention latch 180 remains in an equilibrium state when the handle 160 is in a first position, $H_1$. The engagement between the first portion 162 and the positioning member 122 enables the handle 160 to remain in the first position $H_1$, and the retention latch 180 to remain in the equilibrium state.

In the engaged position $E_1$, the retention latch 180 extends from the frame 120 through the latch aperture 224. The latch aperture 224 is formed in a side wall 228 to enable movement of the retention latch 180 as the handle 160 rotates. The extension from the frame 120 through the latch aperture 224 enables the retention latch 180 to engage with a chassis and secure the disk drive module 100 in or to the chassis.

Referring to FIG. 3A, a front view of the exterior of the disk drive module 100. The second and third portions 164, 166 of the handle 160 are illustrated. The third portion 166 or lever is illustrated approximately flush with the front of the disk drive module 100. The frame 120 does not interfere with the second portion 164. The disk drive module is illustrated to further include an EMI shield 330 connected to the frame 120.

As discussed with reference to FIG. 2A, the first portion 162 is engaging with the positioning member 122. The engagement between the first portion 162 and the positioning member 122 positions the retention latch 180 in an engaged position, $E_1$. FIG. 3A illustrates the retention latch 180 extending from the frame 120 via the latch aperture 224.

FIG. 2B illustrates the handle 160 in the second position, $H_2$. In the second position, $H_2$, the second portion 164 engages with the frame 120 and separates the first portion 162 and the positioning member 122. For example, the separation may be caused by a shifting of the first portion 162, which moves the first portion 162 from the L-shaped guide member 221 along the groove 222 formed in the frame 120. For example, the groove 222 is formed along an interior surface 230 of the frame 120. The shifting moves the first portion towards a protrusion 223 that extends from the interior surface 230 and is adjacent to the groove 222. Separation from the positioning member 122 positions the retention latch 180 to an unengaged position, $E_2$.

As illustrated, the retention latch 180 is pulled inward in the unengaged position, $E_2$. As the motion of the handle 160 pulls the retention latch 180 inward through the latch aperture 224, the retention latch 180 is displaced from the equilibrium state and moved into the unengaged position, $E_2$.

FIG. 3B illustrates the handle 160 in the second position, $H_2$. In the second position, the second portion 164 engages with the frame 120 and separates the first portion 162 and the positioning member 122. As the handle 160 is rotated, the frame 120 provides interference, I, along a front panel 324 with the second portion 14. The interference, I, along the front panel 324 separates the first portion 162 from the positioning member 122. For example, the first portion 162 may shift the position of the first portion 162 along the groove 222 towards the protrusion 223 as illustrated in FIG. 2B, The retention latch 180, when positioned in the unengaged position, $E_2$ is pulled inwards through the latch aperture 224. The inward displacement of the retention latch 180 enables the disk drive module 100 to slide or move along the chassis, for example, to enable removal of the disk drive module 100.

The disk drive module 100 is usable with a hot-plug disk drive module and/or a non-hot-plug disk drive module. A disk drive may be connected to the disk drive module using a set of fasteners 240 extending from the frame 120 to engage with a set of screw holes on the disk drive. For example, a set of screws may be used to secure the disk drive therein, Alternatively, a set of pins may be used to secure the disk drive therein. When a set of pins are used, the disk drive module 100 may further include a base portion to support the frame 120. For example, the base portion may extend from the retention latch 180 or extend from the frame 120. The base portion provides additional support to the frame 120 and aligns the set of pins with the screw holes in the disk drive for proper engagement. The use of the set of pins 540 provides a tool-less assembly since pins are used instead of screws. An example of the base portion is illustrated below in FIG. 5.

Figure 4:
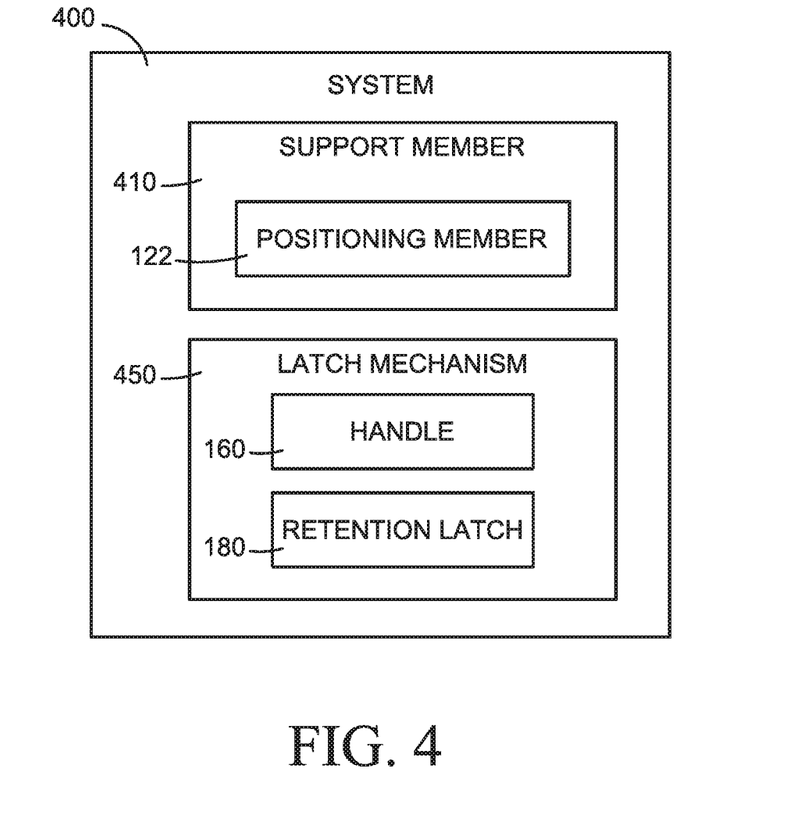
FIG. 4 illustrates a block diagram of a system according to an example.

FIG. 4 illustrates a block diagram of a system 400 according to an example. A system 400 includes a support member 410 and a latch mechanism 450. The support member 410 includes a positioning member 122, The latch mechanism 450 connects to the support member 410.

The latch mechanism 450 includes a handle 160 and a retention latch 180. The handle 160 is formed to rotate about an axis, Rotation of the handle 160 to shift engagement of the handle 160 with the positioning member 122 between an engaged position and an unengaged position. The retention latch 180 to engage with a chassis and secure the support member 410 therein. The retention latch 180 connects to the handle 160. In the engaged position, the handle 160 to connect to the positioning member 122 and the retention latch 180 to engage with a chassis. In the unengaged position, the handle 160 and the positioning member 122 to disconnect and the handle 160 to displace the retention latch 180 to release engagement with the chassis.

Figure 5:
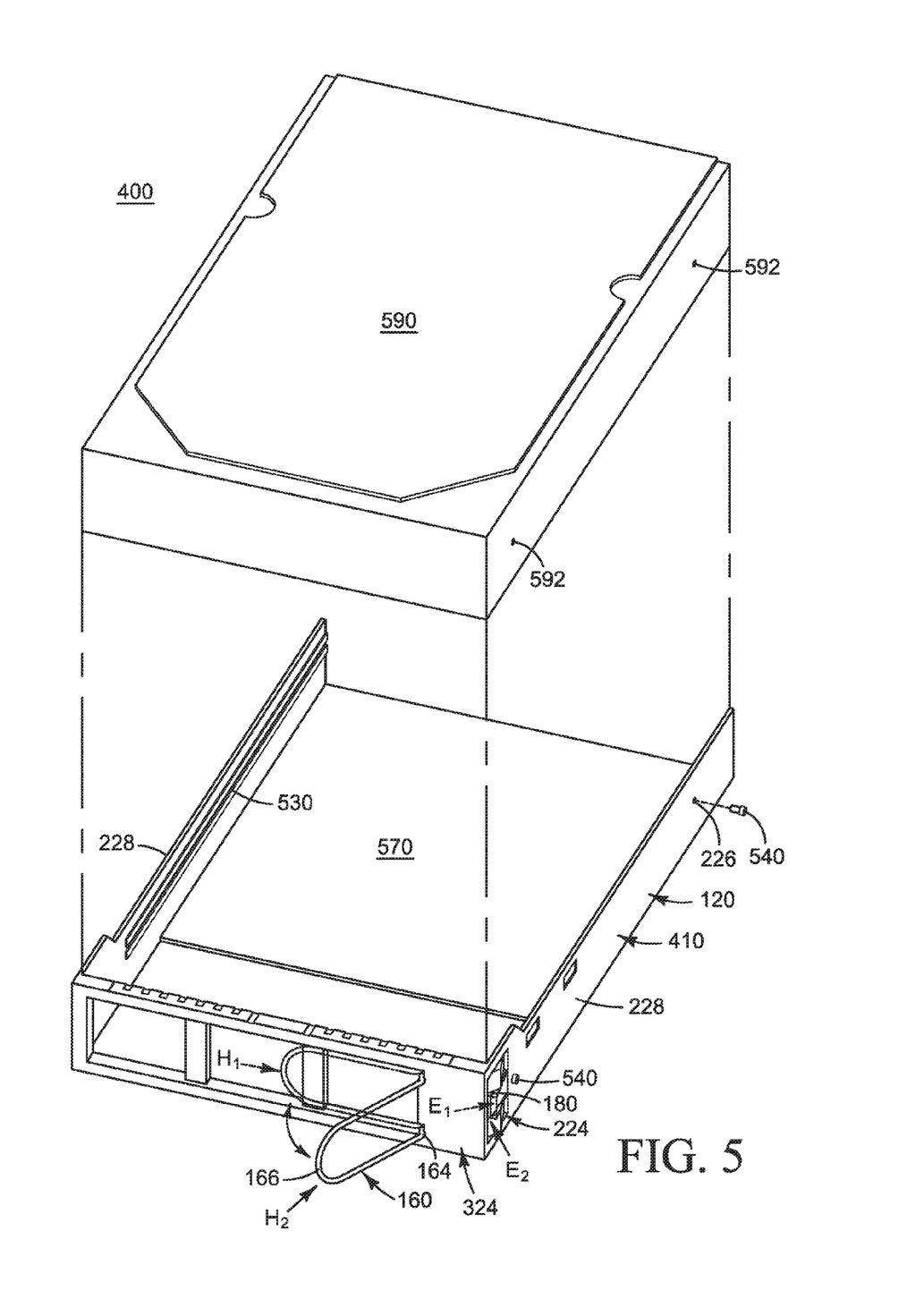
FIG. 5 illustrates a front perspective view of the system of FIG. 4 according to an example.

FIG. 5 illustrates a front perspective view of the system 400 of FIG. 4 according to an example. The system 400 includes the support member 410. The support member 410 is illustrated as including a frame 120 with a latch aperture 224 and a fastener aperture 226 formed therein. The latch mechanism 450 is formed to extend through the latch aperture 224. As illustrated by the broken lines in FIG. 5, the retention latch 180 extends through the latch aperture 224 and remains in the engaged position, $E_1$, when the handle 160 is in a first position, $H_1$. The solid lines in FIG. 5 illustrate the retention latch 180 retracted in the unengaged position, $E_2$.

The latch mechanism 450 includes the handle 160 and the retention latch 180. The latch mechanism 450 moves between an engaged position, $E_1$, and an unengaged position, $E_2$, as the handle 160 rotates. In the engaged position, $E_1$, the handle 160 connects to the positioning member 122 and the retention latch 180 engages with a chassis to retain the system 400 therein. In the unengaged position, $E_2$, the handle 160 and the positioning member 122 disconnect and the handle 160 displaces the retention latch 180 to release engagement of the retention latch 180 with the chassis, as further illustrated in FIG. 6A-6B.

The system 400 is further illustrated to include a disk drive 590, such as a hard disk drive. The disk drive 590 may be attached to the support member 410 using a set of fasteners 240 that extending from or through the fastener apertures 226 of the support member 410 and engage with a set of screw holes 592 on the disk drive 590 to retain the disk drive 590 therein. The set of fasteners 240 may include a set of pins 540 or screws 640 as illustrated in FIG. 6. For example, a set of pins 540 may be used to secure the disk drive 590. When a set of pins 540 are used, the disk drive module 100 may further include a base portion 570 to provide support for the frame 120 of the support member 410. For example, the base portion 570 may extend from the retention latch 180 or extend from the frame 120. The base portion provides additional support to the frame 120 and aligns the set of pins 540 with the screw holes 592 in the disk drive 590 for proper engagement. The use of the set of pins 540 provides a tool-less assembly since pins are used instead of screws 640.

Alternatively, FIG. 6 illustrates a set of screws 640 used to secure the disk drive 590. When the set of screws 640 are used, the support member 410 may be secured to the disk dive 590 using the screws 640 and a frame 120 that includes the front panel 324 and two side walls 228.

Referring back to FIG. 5, the system 400 may be used with a variety of disk drives 590, including a hot-plug disk drive and/or a non-hot-plug disk drive. The system 400 may also include an EMI shield 330. The EMI shield 330 may be formed in the support member 410 or attached thereto 410 as illustrated in FIG. 5. The system 400 may further include a light pipe 530, such as a light emitting diode (LED) light pipe, along the support member 410 to transmit light through the system 400. For example, the light pipe 530 may provide status information to a user based on the color of the light transmitted therealong.

Figure 6A:
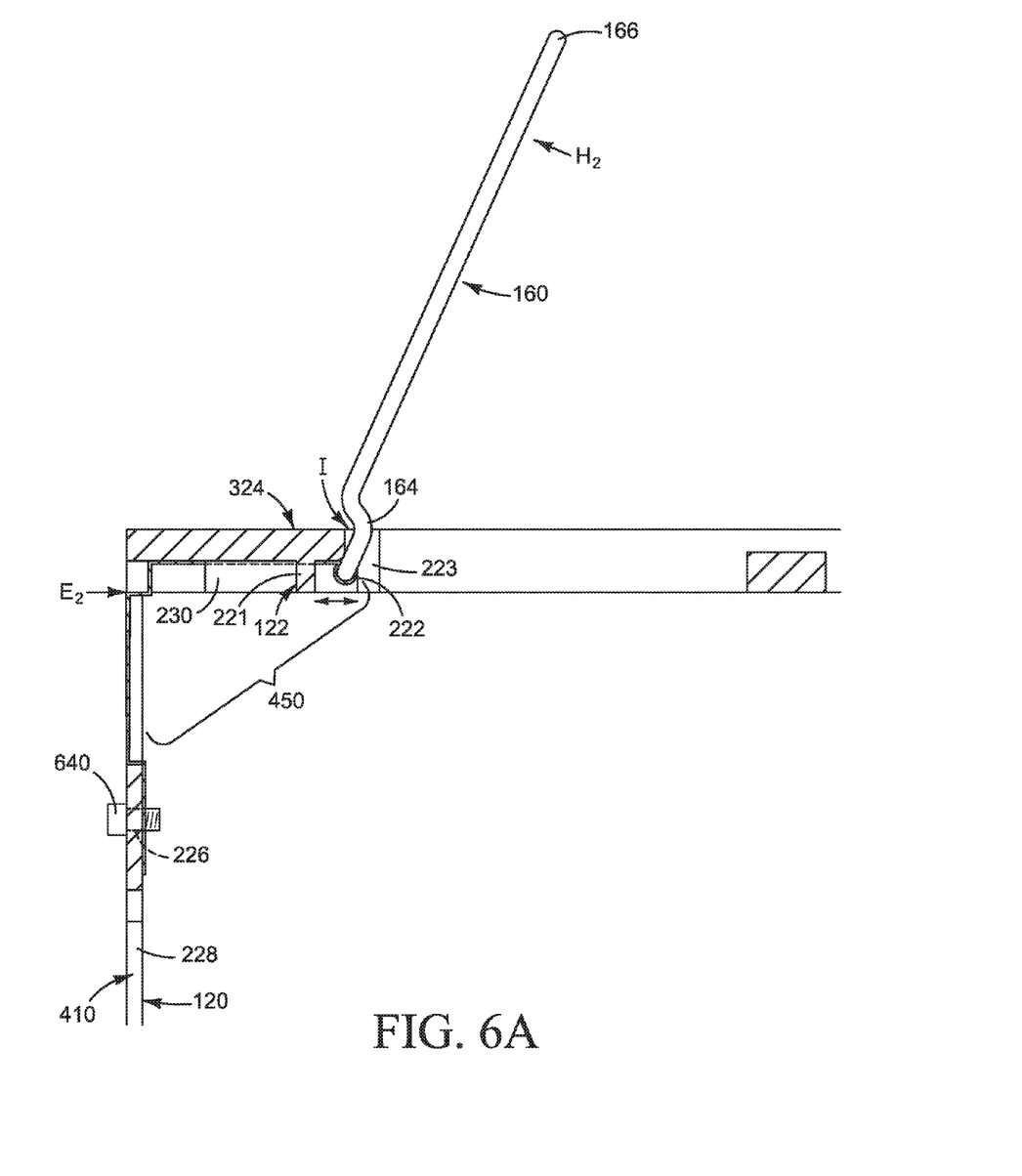
FIGS. 6A-6B illustrate top views of the system of FIG. 4 according to an example.
Figure 6B:
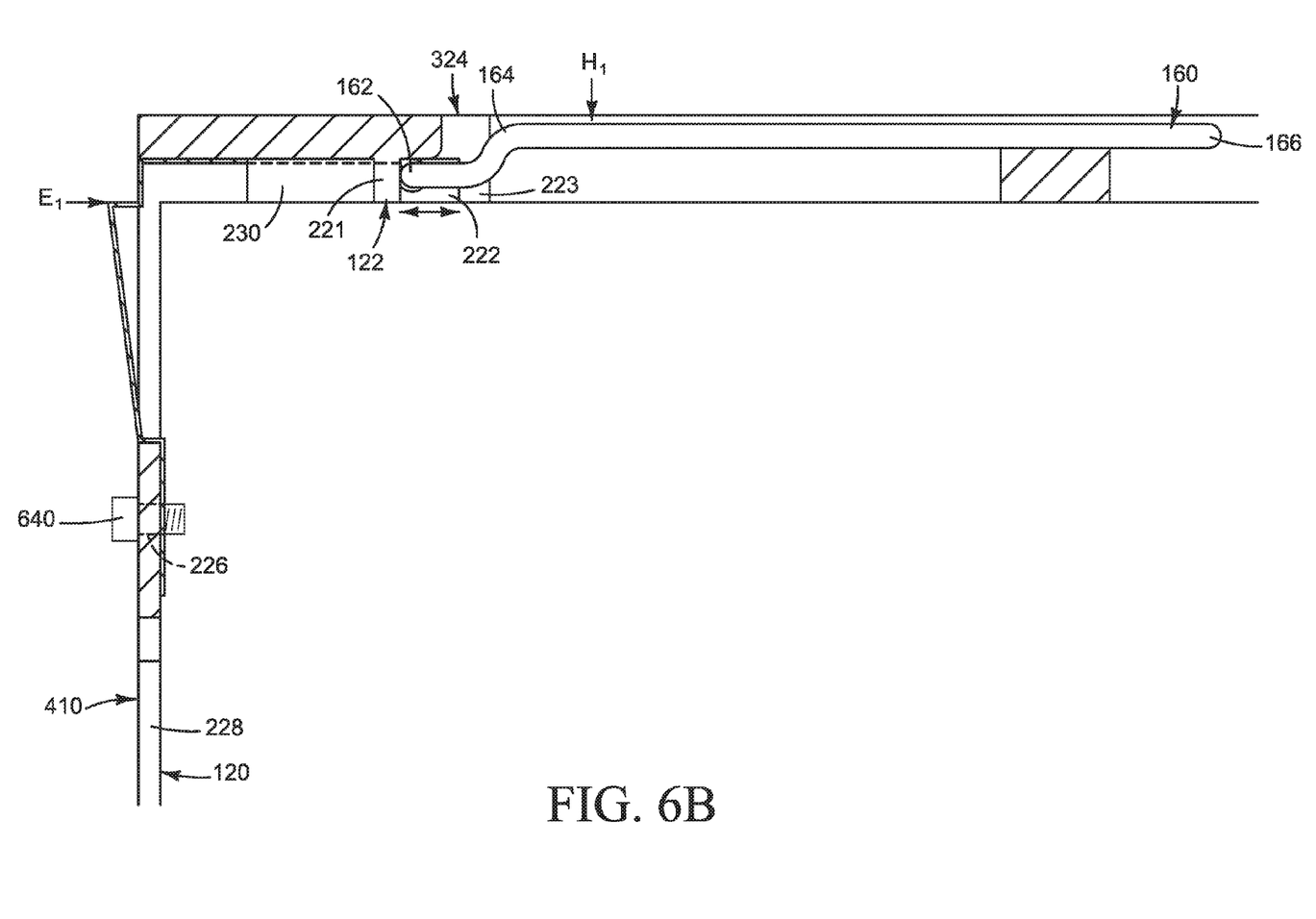

FIGS. 6A-6B illustrate top views of the system of FIG. 4 according to an example. The system 400 as illustrated in FIGS. 6A-6B includes the support member 410 and the latch mechanism 450. The support member 410 includes the positioning member 122 illustrated as an L-shaped guide member 221. A groove 222 is positioned adjacent to the L-shaped guide member 221 to receive a portion of the handle 160. The support member 410 may also include a protrusion 223 adjacent to the groove 222. The protrusion 223 to separate the handle 160 from the positioning member 122 to displace the retention latch 180.

Referring to FIG. 6A, in the unengaged position, $E_2$, the handle 160 and the positioning member 122 are illustrated as disconnected. For example, the handle 160 may include the first portion 162. the second portion 164, and the third portion 166 as illustrated in FIGS. 2A-3B above. The first portion 162 is illustrated as separated from the positioning member 122. Contact with the protrusion 223 that extends from the support member 410 separates the first portion 162 from the positioning member 122. The positioning of the handle 160 displaces the retention latch 180 and releases engagement with the chassis. Displacement of the retaining latch 180 releases the support member 410 from the chassis and enables removal of the support member 410 therefrom.

In contrast, FIG. 6B illustrates the system 400 in the engaged position. In the engaged position, the handle 160 lies approximately flush with the front panel 324 and is positioned in the groove 222 and engaged with the positioning member 122. The third portion 166 is illustrated in a first position, $H_1$. In the engaged position, $E_1$, the retaining latch 180 maintains an equilibrium position to retain the support member 410 in a chassis.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A disk drive module comprising:
   a frame including a positioning member;
   a handle connected to the frame, the handle including a first portion that connects to a retention latch, a second portion extending from the first portion that positions the handle, and a third portion extending from the second portion that forms a lever that rotates about an axis; and the retention latch that connects to the first portion of the handle, the handle moves between a first position and a second position as the lever rotates,
   in the first position, the first portion engages with the positioning member, the engagement between the first portion and the positioning member positions the retention latch in an engaged position, and
   in the second position, the second portion engages with the frame and separates the first portion and the positioning member, separation from the positioning member positions the retention latch in an unengaged position.

2. The disk drive module of claim 1, further comprising an electromagnetic shield.

3. The disk drive module of claim 1, wherein the frame further comprises a latch aperture.

4. The disk drive module of claim 1, further comprising a base portion that supports the frame.

5. The disk drive module of claim 1, wherein the retention latch moves between an equilibrium position and a displaced position based upon the position of the handle.

6. The disk drive module of claim 1, wherein the lever comprises a wire pull handle.

7. The disk drive module of claim 1, wherein the first portion is separated from the positioning member when the first portion contacts a protrusion that extends from an interior surface of the frame.

8. The disk drive module of claim 1, wherein the first portion moves along a groove formed in an interior surface of the frame towards the protrusion that extends from the interior surface of the frame and is adjacent to the groove, engagement with the protrusion separates the first portion and the positioning member.

9. The disk drive module of claim 1, wherein the positioning member is formed of two L-shaped guide members that are formed along an interior surface of the frame.

10. The system of claim 1, wherein the retention latch is displaced inward in the unengaged position.

11. A system comprising
    a support member with a positioning member; and
    a latch mechanism connected to the support member, the latch mechanism includes:
       a handle includes a first portion that connects to a retention latch, a second portion extending from the first portion that positions the handle, and a third portion extending from the second portion that forms a lever that rotates about an axis, rotation of the handle shifts engagement of the handle with the positioning member between an engaged position and an unengaged position, and
       a retention latch connected to the handle,
       in the engaged position, the handle connects to the positioning member and the retention latch , the retention latch extends from the frame, and
       in the unengaged position, the handle and the positioning member disconnect and the handle displaces the retention latch inward.

12. The system of claim 11, further comprising a set of fasteners extending from the support member that engage with a set of screw holes on a disk drive to retain the disk drive therein.

13. The system of claim 11, further comprising an electromagnetic shield.

14. The system of claim 11, further comprising a latch aperture formed in the support member.

15. The system of claim 11, wherein the support member includes a frame.

16. The system of claim 11, wherein the positioning member comprises an L-shaped guide member.

17. The system of claim 11, further comprising a base that provides support for the support member.

18. The system of claim 11, wherein in the engaged position, the retention latch maintains an equilibrium position and extends from the support member, and
in the unengaged position, the retention latch is displaced inward.

19. The system of claim 11, further comprising a protrusion extending from the support member, contact between the first portion and the protrusion separates the first portion from the positioning member, which displaces the retention latch.

20. The system of claim 11, wherein the retention latch extends from the support member via a latch aperture.

* * * * *